(12) United States Patent
Kakino et al.

(10) Patent No.: US 6,551,033 B2
(45) Date of Patent: Apr. 22, 2003

(54) TAPPING APPARATUS AND METHOD

(76) Inventors: Yoshiaki Kakino, 256-5, Iwakura-Hanazono-cho, Sakyo-ku, Kyoto-shi, Kyoto 606-0024 (JP); Makoto Fujishima, c/o Mori Seiki Co., Ltd. 106, Kitakoriyama-cho, Yamatokoriyama-shi, Nara-ken 639-1160 (JP); Hisashi Otsubo, c/o Yasda Precision Tools K.K. 1160, Ohaza-Hamanaka, Satosho-cho, Asakuchi-gun, Okayama-ken 719-0303 (JP); Hideo Nakagawa, c/o Osaka Kiko Co., Ltd. 8-10, Kita-Itami, Itami-shi, Hyogo-ken 664-0831 (JP); Torao Takeshita, c/o Mitsubishi Denki Kabushiki Kaisha Nagoya Seisakusho 1-14, Yadaminami 5-chome, Higashi-ku, Nagoya-shi, Aichi-ken 461-8670 (JP); Yoshinori Yamaoka, c/o Yamazaki Mazak Kabushiki Kaisha 1, Aza-Norifune, Ohaza-Oguchi, Oguchi-cho, Niwa-gun, Aichi-ken 480-0197 (JP)

( * ) Notice: Subject to any disclaimer, the term of this patent is extended or adjusted under 35 U.S.C. 154(b) by 125 days.

(21) Appl. No.: 09/771,815

(22) Filed: Jan. 29, 2001

(65) Prior Publication Data

US 2001/0015116 A1 Aug. 23, 2001

(30) Foreign Application Priority Data

Jan. 31, 2000 (JP) .................................... 2000-022154

(51) Int. Cl.$^7$ .......................... B23B 39/04; B23B 39/08
(52) U.S. Cl. .................................... 408/9; 408/3
(58) Field of Search ....................... 82/1.11, 1.2, 1.3, 82/1.4, 1.5, 47, 133, 118; 407/24; 409/65, 74, 222; 470/198, 199; 408/3, 8, 9; 700/170, 171, 175

(56) References Cited

U.S. PATENT DOCUMENTS

| | | | | |
|---|---|---|---|---|
| 4,854,786 A | * | 8/1989 | Alexander et al. | 408/1 R |
| 4,879,660 A | * | 11/1989 | Asakura et al. | 318/39 |
| 4,985,841 A | * | 1/1991 | Iwagaya | 408/11 |
| 5,144,772 A | * | 9/1992 | Kawamata et al. | 409/199 |
| 5,315,789 A | * | 5/1994 | Takashi | 451/11 |
| 5,352,069 A | * | 10/1994 | Rourke | 408/1 R |
| 5,733,198 A | * | 3/1998 | Tsutsui et al. | 470/18 |
| 5,895,177 A | * | 4/1999 | Iwai et al. | 408/1 R |
| 5,921,726 A | * | 7/1999 | Shiozaki et al. | 408/6 |
| 6,344,724 B1 | * | 2/2002 | Kakino et al. | 318/569 |
| 6,384,560 B1 | * | 5/2002 | Kakino et al. | 318/566 |

FOREIGN PATENT DOCUMENTS

| JP | 04030910 A | 2/1992 |
|---|---|---|
| JP | 11-010483 | 1/1999 |

* cited by examiner

*Primary Examiner*—A. L. Wellington
*Assistant Examiner*—Brian D Walsh
(74) *Attorney, Agent, or Firm*—Crompton, Seager & Tufte, LLC

(57) ABSTRACT

A CNC tapping machine includes a spindle to which a tap is attached and a spindle motor for rotating the spindle. The load torque acting on the spindle motor that is detected when performing a tapping procedure without a workpiece is stored in a memory as referential, torque data. During a tapping procedure, a detection device detects the load torque acting on the spindle motor. A computer computes the difference between the load torque defected by the detection device and the referential load torque and uses the difference as the cutting load acting on the tap. As a result, the cutting load torque acting on the tap is accurately detected.

22 Claims, 7 Drawing Sheets

TAPPING APPARATUS AND METHOD

BACKGROUND OF THE INVENTION

The present invention relates to a tapping apparatus and method.

To cut an internal thread in a workpiece, a numerically controlled machine tool such as a machining center and a numerically controlled (NC) tapping machine are used. Such a machine tool includes a spindle, to which a tap is attached, a spindle motor for rotating the spindle and a feed motor for moving the spindle in the axial direction. When tapping a workpiece, the spindle motor and the feed motor are controlled such that the rotational phase of the spindle changes in synchronization with the axial position (feed position) of the spindle.

A tapping procedure includes a cutting process and a withdrawing process. In the cutting process, a tap is moved axially from a start position, which is separated from the workpiece by a predetermined distance, to an end position, at which the tap is located in the workpiece. In the withdrawing process, the tap is moved from the end position to the start position. The cutting process includes an acceleration step, a constant speed step and a deceleration step. In the acceleration step, the rotational speed of the spindle is increased from zero to the maximum level. In the constant speed step, the rotational speed of the spindle is maintained at the maximum level. In the deceleration step, the rotation speed of the spindle is decreased from the maximum level to zero. The withdrawing process also includes an acceleration step, a constant speed step and a deceleration step.

During a tapping procedure, the load on the tap can be excessive due to the expiration of the life of the tap T or to swarf trapped between the thread and the tap. An excessive cutting load may damage the tap and the internal thread formed in the workpiece. Japanese Unexamined Patent Publication No. 4-30910 discloses a numerically controlled machine tool that discontinues tapping when a tap receives an excessive cutting load.

In the machine tool of the above publication, load acting on the spindle motor is detected during a tapping procedure. Also, whether the load is greater than a predetermined acceptable level is detected. When the load surpasses the acceptable level, the spindle motor and the feed motor are stopped, which stops rotation and axial movement of the spindle. Thereafter, the spindle motor and the feed motor are started, which rotates and axially moves the spindle such that the tap is returned to the start position. As a result, the tap and the workpiece are prevented from being damaged.

The level of the electric current supplied to the spindle motor varies in accordance with load acting on the spindle motor. Therefore, in the machine tool of the publication, the load acting on the spindle motor is detected based on the level of the current supplied to the spindle motor.

Load acting on the spindle motor includes not only the cutting load due to cutting of the workpiece but also inertial load due to the inertial force of the rotating members such as the rotor of the spindle motor and the spindle. The inertial load, which is generated when the spindle is being accelerated and the decelerated, is considerably greater than the cutting load. When the spindle is rotating at a constant speed, little inertial load is generated and the load acting on the spindle motor consists mainly of cutting load.

In the machine tool of the publication, the load acting on the spindle motor is detected only when the spindle is rotating at a constant speed. Specifically, the load is detected only from immediately before the acceleration step is finished to when the constant speed step is finished. Therefore, the cutting load acting on the tap is substantially accurately detected when the spindle is rotating at a constant speed.

However, when measured with a measuring instrument, the cutting load torque increases during the deceleration step and is maximized at the end of the deceleration step. The machine tool of the publication cannot detect an excessive cutting load during the deceleration step.

When a workpiece made of a low hardness metal such as aluminum is tapped, the cutting load is small. Therefore, the rotation speed of the spindle and the feeding speed can be increased, which reduces the time required for tapping. In this case, the spindle starts being decelerated after a relatively short period has passed from when the acceleration step is finished. That is, the time during which the spindle is driven at a constant speed is significantly short. Thus, it is extremely difficult for the machine tool of the publication to detect the cutting load acting on the tap.

SUMMARY OF THE INVENTION

Accordingly, it is an objective of the present invention to provide a tapping apparatus and a tapping method that continuously and accurately detect the cutting load acting on a tap.

To achieve the foregoing and other objectives and in accordance with the purpose of the present invention, a tapping apparatus for cutting an internal thread in a workpiece with a tap is provided. The tapping apparatus includes a spindle to which the tap is attached, a spindle motor for rotating the spindle, a detection device for detecting the load acting on the spindle motor during a tapping procedure and a computer. The computer compares the load detected by the detection device with a predetermined referential load to detect a relative cutting load acting on the tap.

The present invention also provides a tapping method for cutting an internal thread in a workpiece with a tap. The method includes rotating a spindle to which the tap is attached by a spindle motor to perform a tapping procedure, detecting the load acting on the spindle during the tapping procedure and comparing the detected load with a predetermined referential load to detect a relative cutting load acting on the tap.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

Figure 1:
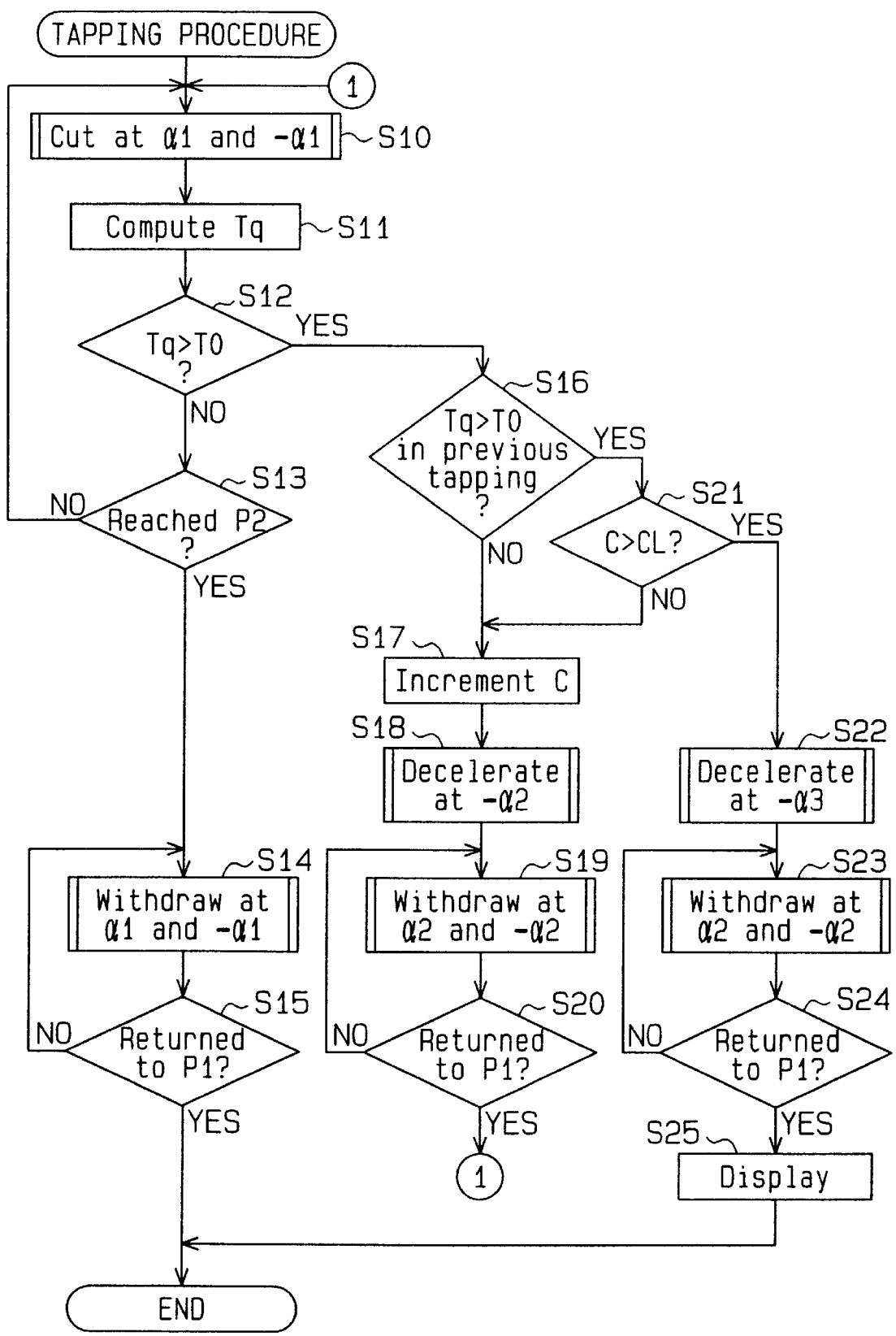
FIG. 1 is a flowchart showing a routine of a tapping procedure according to a first embodiment of the present invention.

A first embodiment of the present invention will now be described with reference to FIGS. 1 to 9. As shown in FIG. 2, a computer numerical control (CNC) tapping machine 10 includes a machining device 11 and a control device 12. The machining device 11 has a worktable 13, which can be moved along an X axis and a Y axis, and a spindle 14, which can be moved along a Z axis. A tap T is attached to the spindle 14. The spindle 14 is rotated by the spindle motor 15. The spindle 14 is moved along the Z axis by a feed motor 16. An X axis motor 17 and a Y axis motor 18 moves the worktable 13 along the X axis and the Y axis, respectively, for determining the position of a workpiece W placed on the worktable 13 relative to the spindle 14. A predetermined portion of the workpiece W is tapped by rotating and moving the spindle 14 toward the workpiece W.

The machining device 11 includes an X coordinate detector 19 for detecting the X coordinate of the worktable 13, a Y coordinate detector 20 for detecting the Y coordinate of the worktable 13, a rotational phase detector 21 for detecting the rotational phase of the spindle 14 and a Z coordinate detector 22 for detecting the Z coordinate of the spindle 14.

The control device 12 includes a computer 23 that has a central processing unit (CPU) 30, a memory 31 and an input-output interface 34. The memory 31 stores programs and data used for controlling the machining device 11 and for machining the workpiece W. The CPU 30 controls the machining device 11 such that the workpiece W is tapped in a predetermined manner according to the programs and the data stored in the memory 31.

An input device 32 and a display device 33 are connected to the input-output interface 34. The input device 32 is, for example, a keyboard through which information needed for machining is manually input. The display device 33 displays the information input through the input device and other information such as the working status of the tapping machine 10.

The motors 15, 16, 17 and 18 are connected to the input-output interface 34 through drivers 26, 27, 28 and 29, respectively. The CPU 30 controls the motors 15–18 through the drivers 26–29. The detectors 19–22 are connected to the input-output interface 34. The CPU 30 feedback controls the motors 15–18 in accordance with detection values from the detectors 19–22.

The memory 31 stores data representing the machining conditions for the workpiece W. The machining conditions include a machining position of the workpiece W, which is represented by X and Y coordinates, a start position P1 and an end position P2 of the tap T, which are represented by Z coordinates, the rotational phase of the spindle 14 at the start position P1, the size and pitch of the tap T and the maximum rotational speed of the spindle 14.

During a tapping procedure, the CPU 30 controls the motors 15–18 of the machining device 11 according to the data of the machining conditions stored in the memory 31. Also, the CPU 30 controls the spindle motor 15 and the feed motor 16 such that the rotational phase of the spindle 14 and the axial position (feed position) of the spindle 14 change in synchronization. Therefore, the rotational phase of the spindle 14 always has a one-to-one relationship with the feed position of the spindle 14.

Figure 3:
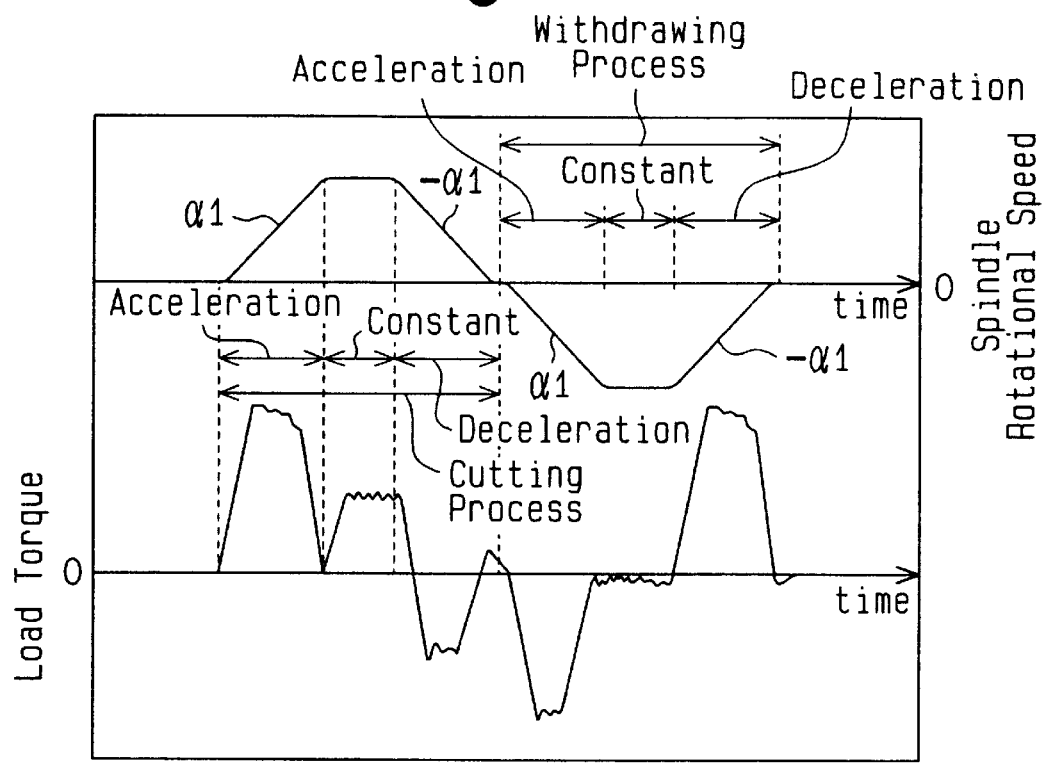
FIG. 3 is a graph showing changes of the rotational speed of the spindle and load torque acting on the spindle motor during a tapping procedure.

As shown in the upper portion of the graph of FIG. 3, the tapping procedure includes a cutting process and a withdrawing process. In the cutting process, the tap T is moved from the start position P1, which is spaced from the workpiece W, to the end position P2, at which the tap T is located in the workpiece W. In the withdrawing process, the tap T is returned from the end position P2 to the start position P1. The cutting process and the withdrawing process each include an acceleration step, a constant speed step and a deceleration step. In the acceleration step, the rotational speed of the spindle 14 is increased from zero to the maximum rotational speed, which is determined based on the machining condition data. In the constant speed step, the rotational speed of the spindle 14 is maintained at the maximum rotational speed. In the deceleration step, the rotational speed of the spindle 14 is decreased from the maximum speed to zero.

In the acceleration step, the spindle 14 is accelerated at a predetermined acceleration rate $\alpha 1$. In the deceleration step, the spindle 14 is decelerated at a deceleration rate $-\alpha 1$, which has the same magnitude as the acceleration step $\alpha 1$. The tap T starts cutting the workpiece W during or after the acceleration stop in the cutting process.

As shown in FIG. 2, a load detection device 25 detects the level of current that is supplied to the spindle motor 15 through the driver 26 as the load acting on the spindle motor 15. The CPU 30 obtains the load acting on the spindle motor 15 based on a detection value from the load detection device 25.

The load torque acting on the spindle motor 15 includes cutting load torque due to cutting of the workpiece W by the tap T and an inertial load torque due to the inertial force of rotational members such as the rotor of the spindle motor 15 and the spindle 14. The Load torque acting on the spindle motor 15 also includes a friction load torque due to friction between the spindle 14 and a bearing receiving the spindle 14.

FIG. 3 is a graph showing changes of the rotational speed of the spindle 14 and the load torque acting on the spindle motor 15 during a tapping procedure. The load torque shown in the graph of FIG. 3 represents a case where the tap T actually cuts the workpiece W after the acceleration step of the cutting process is finished. Therefore, during the acceleration step of the cutting process, the load torque does not include the cutting load torque. The inertial load torque is generated when the spindle 14 is being accelerated or decelerated. When the speed of the spindle 14 is constant, little inertial load torque is generated.

During a tapping procedure that is specified through the input device 32, the CPU 30 stores a load torque detected by the load detection device 25 into the memory 31 as referential torque data. The changes in the referential load torque are stared in relation with the rotational phase and the feed position of the spindle 14 during the tapping procedure, or from when the tap T starts moving from the start position P1 toward the end position P2 to when the tap T is returned to the start position P1. The referential torque data is obtained, for example, when a brand new tap T is attached to the spindle 14 and is used for tapping for the first time.

During a tapping procedure, the CPU 30 compares the load torque detected by the load detection device 25 with the referential torque data stored in the memory 31. Specifically, the CPU 30 compares the current value of the load torque with a value in the torque data that corresponds to the current rotational phase and the feed position. The CPU 30 sets the difference between the actual load torque and the referential load torque as a relative cutting load torque, or an increase of the cutting load torque. That is, only the cutting load torque increases among the torques acting on the spindle as the wear of the tap T develops. Therefore, after the referential load torque data is obtained, an increase of the load torque acting on the spindle 14 compared to the referential torque represents an increase of the cutting torque. Based on the amount of the increase of the cutting torque, the degree of the wear of the tap T is obtained.

Figure 4:
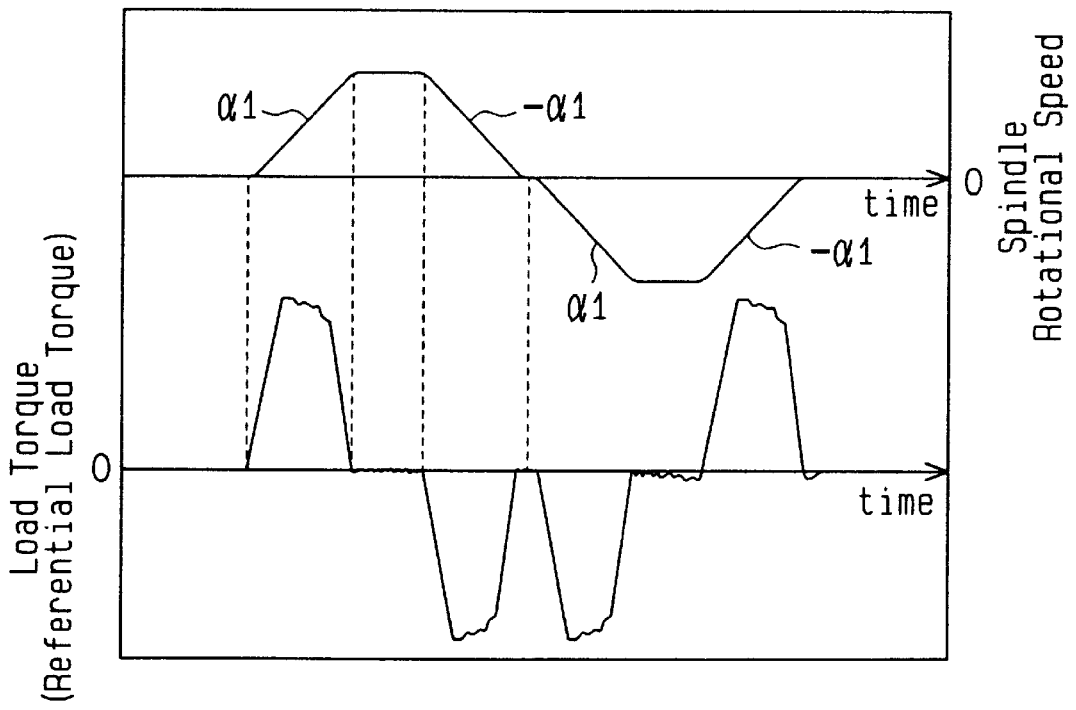
FIG. 4 is a graph showing changes of the rotational speed of the spindle and the load torque acting on the spindle motor during a no-workpiece operation.

The referential torque data may be obtained during a no-workpiece operation. The no-workpiece operation refers to performing the same procedure as a tapping procedure without the workpiece W. The graph of FIG. 4 shows changes of the rotational speed of the spindle 14 and the load torque acting on the spindle motor 15 during a no-workpiece operation. The load torque in the graph of FIG. 4 does not include the cutting load torque. Therefore, the cutting load torque during an actual tapping procedure can be accurately detected by comparing the actual load torque with the referential load torque, which is obtained through a no-workpiece operation.

Figure 5:
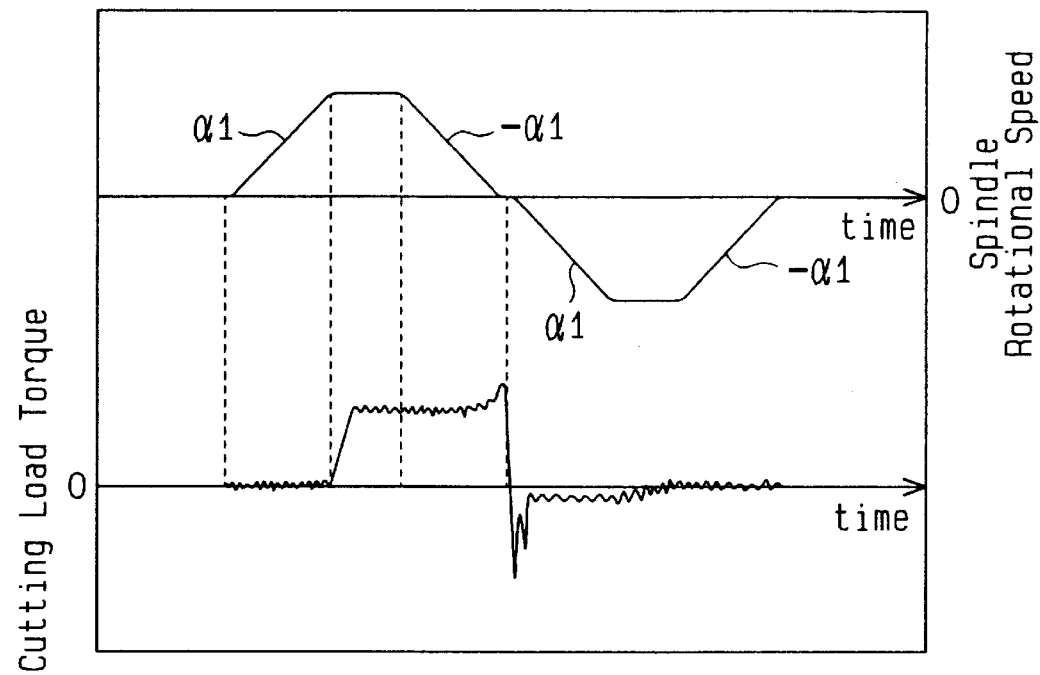
FIG. 5 is a graph showing changes of the rotational speed of the spindle and cutting load torque during a tapping procedure.

FIG. 5 shows changes of the difference between the load torque shown in FIG. 3 and the load torque shown in FIG. 4, or the difference between the load torque detected during a tapping procedure and the load torque during a no-workpiece operation. The difference represents a relative cutting load torque, or the pure values of the cutting load torque. The values of the cutting torque in FIG. 5 substantially match the values of the cutting torque detected by a measuring instrument.

As shown in FIG. 5, the cutting load torque increases to a certain level during the constant speed step of the cutting process and is then maintained at the level. The cutting torque is gradually increased in the latter half of the deceleration step and is maximized when the deceleration step is completed. If swarf is caught between the tap T and the threaded hole during the cutting process, the cutting torque abruptly increases.

Figure 2:
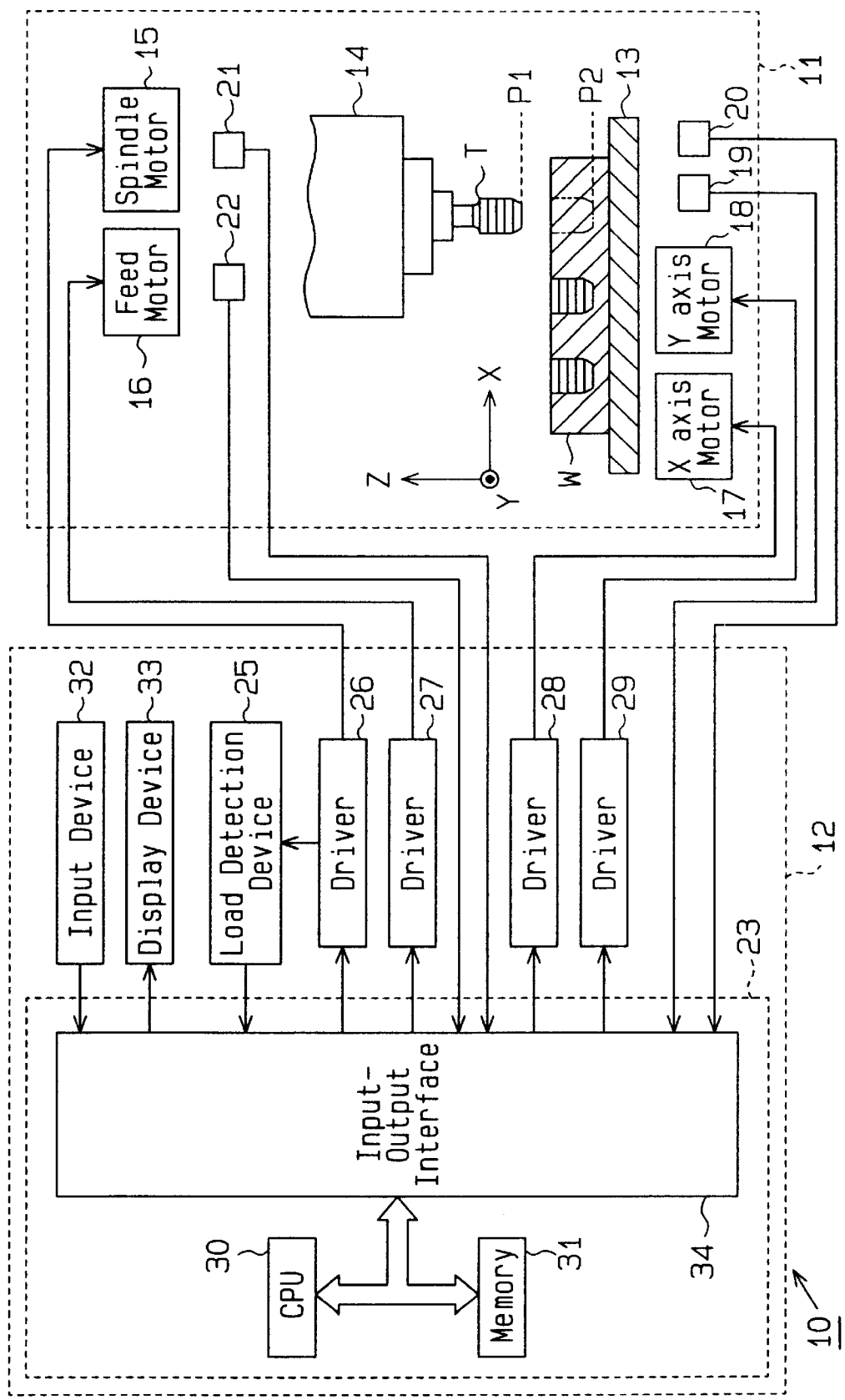
FIG. 2 is a diagrammatic view illustrating a computer numerical control (CNC) tapping machine.

FIG. 1 is a flowchart showing a tapping procedure executed by the CPU 30. Prior to the routine of FIG. 1, the CPU 30 controls the X axis motor 17 and the Y axis motor 18 according to the predetermined machining conditions to determine the X coordinate and the Y coordinate of the workpiece W on the worktable 13 relative to the spindle 14. The CPU 30 also controls the feed motor 16 to move the rap T to the start position P1, which is determined by the machining conditions. Further, the CPU 30 controls the spindle motor 15 such that the spindle 14 is at a rotational phase that corresponds to the start position P1 of the tap T. At this stage, a no-workpiece operation has been performed for obtaining the referential load torque date.

In step S10, the CPU 30 executes the cutting procedure. That is, the CPU 30 controls the spindle motor 15 and the feed motor 16 to move the spindle 14 toward the workpiece W while rotating the spindle 14. In the acceleration step of the cutting procedure, the CPU 30 accelerates the spindle 14 at a predetermined first acceleration rate $\alpha 1$. In the deceleration step, the CPU 30 decelerates the spindle 14 at a predetermined first deceleration rats $-\alpha 1$.

During a tapping procedure, it is more difficult to remove swarf from the threaded hole as the acceleration step or the deceleration step of the spindle 14 is increased and as the degree of the wear of the tap T is greater. Thus, swarf may be stuck in the threaded hole, which increases the cutting load torque acting on the tap T. When no swarf is stuck in the threaded hole and the tap T is not significantly worn, the spindle 14 can he accelerated and decelerated at relatively great values of the first acceleration rate $\alpha 1$ and the first deceleration rate $-\alpha 1$, which permits a tapping procedure to be smoothly completed in a relatively short time.

In step S11, the CPU 30 computes the difference between the load torque sent from the load detection device 25 and the referential load torque and sets the resultant as the cutting load torque Tq. In step S12, the CPU 30 judges whether the cutting torque Tq is greater than a predetermined acceptable level T0. If the cutting torque Tq is equal to or less than the acceptable level T0, the CPU 30 judges that the tap T is not worn to the extent that the tap T is at the end of its life and that there is no swarf stuck in the hole. Then, the CPU 30 executes step S13.

In step S13, the CPU 30 judges whether the tap T has reached the end position P2. If the tap T has not reached to the end position P2, the CPU 30 returns to step S10 and continues the cutting process. If the tap T has reached to the end position P2, the CPU 30 judges that the cutting process is completed and executes step S14.

In step S14, the CPU 30 executes the withdrawing process. That is, the CPU 30 controls the spindle motor 15 and the feed motor 16 for separating the spindle 14 from the workpiece W while rotating the spindle 14. During the withdrawing process, the CPU 30 accelerates the spindle 14 at the first acceleration rate $\alpha 1$ in the acceleration step and decelerates the spindle 14 at the first deceleration rate $-\alpha 1$ in the deceleration step.

In step S15, the CPU 30 judges whether the tap T has returned to the start position P1. The CPU 30 continues the withdrawing process until the tap T returns to the start position P1. When the tap T returns to the start position P1, the CPU 30 judges that the tapping procedure and terminates the procedure.

If the cutting torque Tq exceeds the acceptable level T0 in step S12, the CPU 30 judges that the tap T is worn to the extent that it has reached the end of its life or that swarf is stuck in the threaded hole and executes step S16. In stop S16, the CPU 30 judges whether the cutting load torque Tq exceeded the acceptable level T0 when tapping the same portion of the workpiece W in the previous tapping procedure.

If the outcome of step 316 is negative, the CPU 30 judges that the cause of the excessive cutting load torque Tq is stuck swarf and executes seep S17. In step S17, the CPU 30 increments a count value C. In step S18, the CPU 30 decelerates the spindle 14 at a second deceleration rate $-\alpha 2$, which 15 smaller than the first deceleration rate $-\alpha 1$, for discontinuing the cutting process. Accordingly, the rotation and axial movement of the spindle 14 are stopped.

If step S18 is executed while the spindle 14 is rotating at a constant speed, or at the maximum speed as shown in FIG.

6, the CPU 30 decelerates the spindle 14 at the second deceleration rate −α2. If step S18 is executed while the spindle 14 is being decelerated at the first deceleration rate −α1, the CPU 30 switches the first deceleration rate −α1 to the second deceleration rate −α2.

As described above, the spindle 14 is decelerated at the second deceleration rate −α2, which is smaller than the first deceleration rate −α1, when the cutting process need be discontinued. As a result, stuck swarf is smoothly removed. Thus, the cutting load torque Tq does not excessively increase due to stuck swarf The tap T and the internal thread are not damaged.

Figure 6:
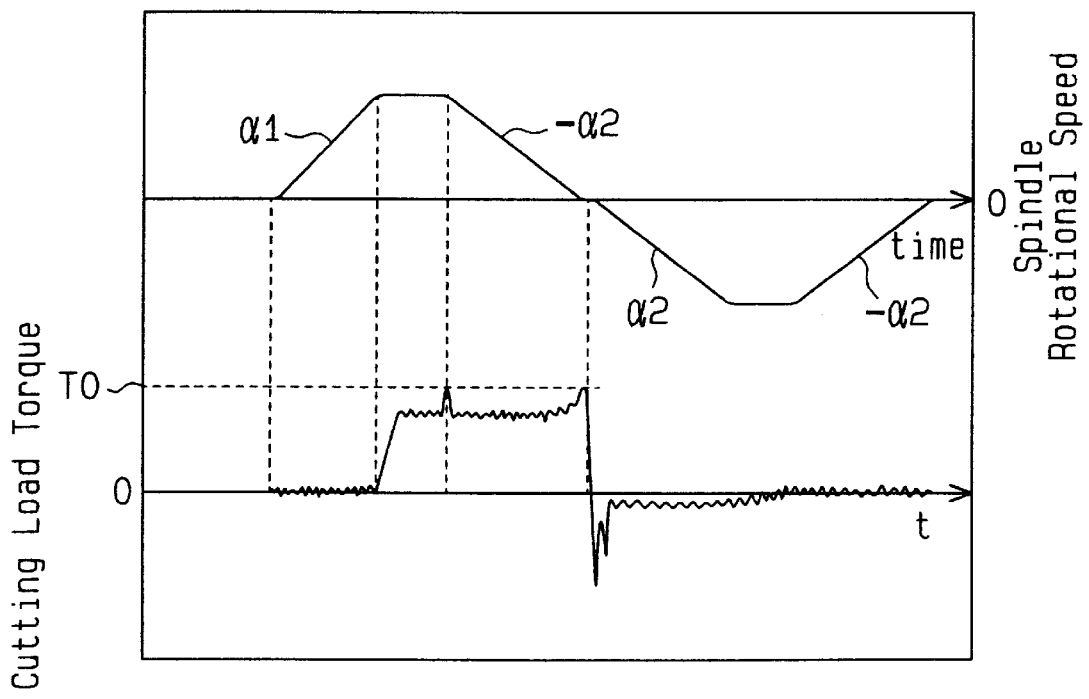
FIG. 6 is a graph showing changes of the rotational speed of the spindle and cutting load torque when a cutting process is discontinued.
Figure 7:
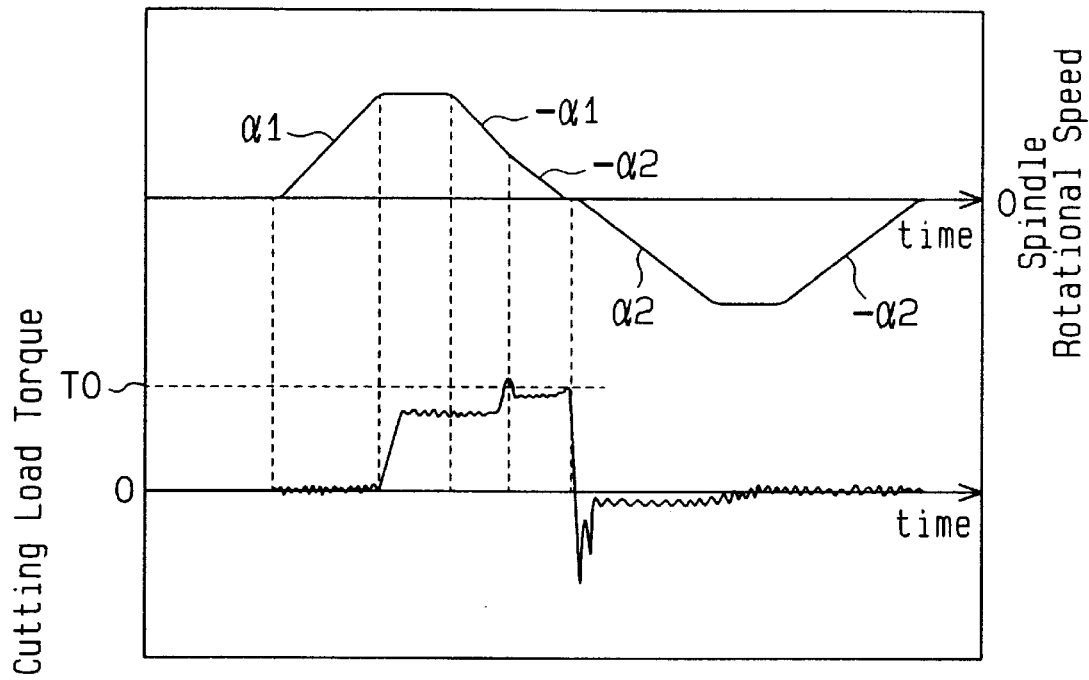
FIG. 7 is a graph showing changes of the rotational speed of the spindle and cutting load torque when the cutting process is discontinued.

When the rotation and axial movement of the spindle 14 are stopped, the CPU 30 starts the withdrawing process in step S19. That is, the CPU 30 controls the spindle motor 15 and the feed motor 16 for separating the spindle 14 from the workpiece W while rotating the spindle 14. As shown in FIGS. 6 and 7, the CPU 30 accelerates the spindle 14 at the second acceleration rate α2 in the acceleration stop and decelerates the spindle 14 at the second deceleration rate −α2 in the deceleration step. Therefore, the cutting load torque Tq is not excessively increased during the withdrawing process.

In step S20, the CPU 30 judges whether the tap T has returned to the start position P1. The CPU 30 continues the withdrawing process until the tap T is returned to the start position P1. When the tap T is returned to the start position P1, the CPU 30 moves back to step S10 and restarts the tapping procedure to the same portion of the workpiece W that has been tapped.

As described above, when the cutting torque Tq is judged to be excessively increased due to stuck swarf, the tapping procedure is discontinued. Then, the tap T is returned to the start position P1. Thereafter, the same portion of the workpiece W is tapped again.

If the outcome of step S16 is positive, the CPU 30 executes step S21 and judges whether the count value C has exceeded a predetermined determination value CL. If the count value C is equal to or less than the determination value CL, the CPU 30 judges that the cutting torque Tq exceeded the acceptable level T0 due to stuck swarf and executes step S17. Then, the cutting process is discontinued in the above described manner and the same portion of the workpiece W is tapped again.

If the count value C exceeds the determination value CL, the CPU 30 judges that the cutting torque Tq exceeded the acceptable level T0 because the tap T is at the end of its life and executes step S22. In other words, if the same portion of the workpiece W has been tapped for a predetermined number of times when the cutting torque Tq exceeds the acceptable level T0, the CPU 30 judges that the tap T is at the end of its life. In step S22, the CPU 30 decelerates the spindle 14 at a third deceleration rate −α3, which is greater than the first deceleration rate −α1, to discontinue the cutting process and eventually stops the rotation and axial movement of the spindle 14.

Figure 8:
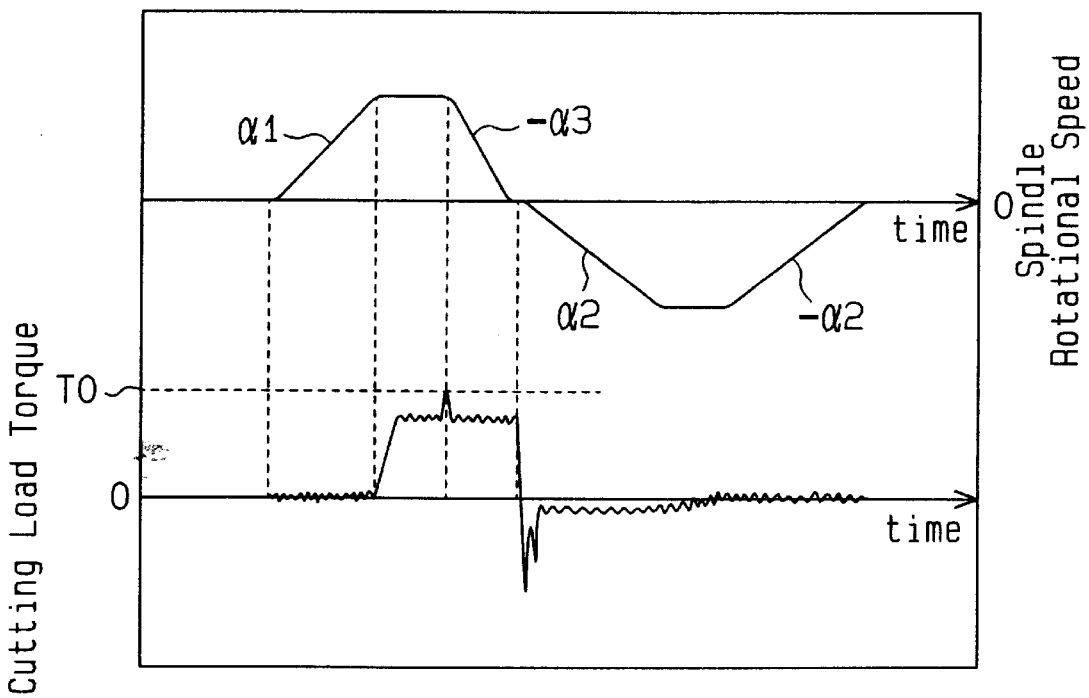
FIG. 8 is a graph showing changes of the rotational speed of the spindle and cutting load torque when the cutting process is discontinued.

If step S22 is executed when the spindle 14 is rotating at a constant speed, the CPU 30 decelerates the spindle 14, which is rotating at the maximum speed, at the third deceleration rate −α3 as shown in FIG. 8. If step S22 is executed while the spindle 14 is being decelerated, the CPU 30 switches the deceleration step of the spindle 14 from the first deceleration rate −α1 to the third deceleration rate −α3.

If the life of the tap T ends during a tapping procedure, continuing the tapping procedure is likely to increase the cutting load torque Tq, which may break the tap T. In the illustrated embodiment of FIGS. 1 to 9, the cutting process is quickly stopped by decelerating the spindle 14 at the third deceleration rate −α3, which is greater than the first deceleration rate −α1. As a result, the cutting load torque Tq is prevented from increasing.

Figure 9:
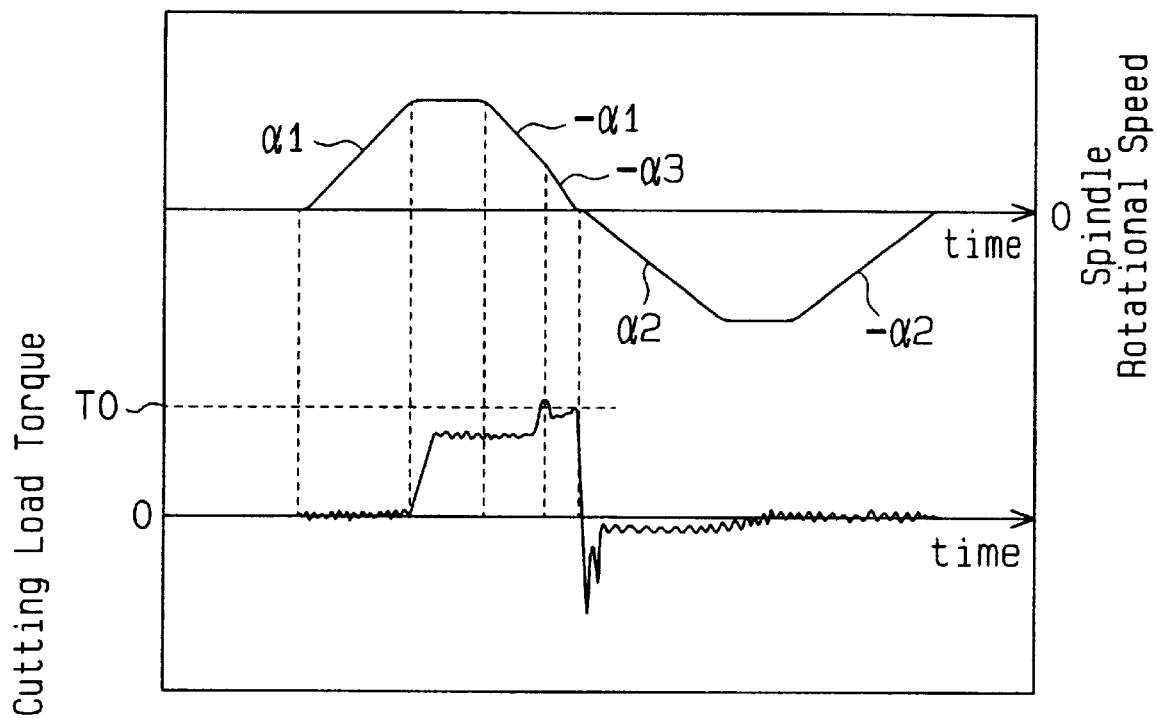
FIG. 9 is a graph showing changes of the rotational speed of the spindle and cutting load torque when the cutting process is discontinued.

When the rotation and the axial movement of the spindle 14 are stopped, the CPU 30 starts the withdrawing process in step S23. As shown in FIGS. 8 and 9, the CPU 30 accelerates the spindle 14 at the second acceleration rate α2 in the acceleration step and then decelerates the spindle 14 at the second deceleration rate −α2 in the deceleration step.

In step S24, the CPU 30 judges whether the tap T has returned to the start position P1. The CPU 30 continues the withdrawing process until the tap T reaches the start position P1. When the tap T is returned to the start position P1, the CPU 30 executes step S25. In step S25, the CPU 30 controls the display device 33 to indicate that the tap T is at the end of its life and then terminates the routine. Thereafter, a tapping procedure will not be performed until the tap T is replaced by a new one.

As described above, when the torque Tq is judged to be excessive due to the expiration of the life of the tap T, a tapping procedure is discontinued. Then, after the tap T is returned to the start position P1, the display device 33 indicates that the tap T is at the end of its life.

The embodiment of FIGS. 1–9 has the following advantages.

The referential torque is obtained through a specific tapping procedure, which may be a no-workpiece operation, is stored in the memory 31. In an actual tapping procedure, the load torque in compared with the referential load torque to accurately detect the cutting load torque Tq acting on the tap T. Not only when the tap T is rotating at a constant speed, but also when the spindle 14 is accelerating or decelerating, the cutting torque Tq acting on the tap T is accurately detected. Thus, whether an excessive torque is acting on the tap T is accurately detected through the entire tapping procedure.

If the referential load torque is obtained in a no-workpiece operation, a pure cutting load torque Tq can be obtained. Therefore, whether the tap T is at the end of its life and whether swarf is stuck in the threaded hole are easily and accurately detected based on the cutting load torque Tq.

When the cutting torque Tq is judged to be excessive due to stuck swarf, the spindle 14 is decelerated at the second deceleration rate −α2, which is smaller than the first deceleration rate −α1, for discontinuing the tapping procedure. As a result, the stuck swarf is removed and the cutting torque Tq is prevented from being excessive due to stuck swarf. Therefore, the tap T and the internal thread formed in the workpiece W are not damaged.

When the cutting load torque Tq is judged to be excessive due to stuck swarf, the tapping procedure is discontinued and the same portion of the workpiece W is tapped again. Thus, after the swarf is removed, the threaded hole is formed.

When the cutting load torque Tq is judged to be excessive due to the expiration of the life of the tap T, the spindle 14 is decelerated at the third deceleration rate −α3, which is greater than the first deceleration rate −α1, for quickly stopping the tapping procedure. As a result, the cutting load torque Tq is prevented from being further increased. The tap T is thus prevented from being broken.

When the cutting load torque Tq is judged to be excessive due to the expiration of the life of the tap T, the display device 33 displays that the tap T is at the end of its life after the tapping procedure is discontinued, which positively notifies an operator of the end of the life of the tap T. Also, the display device 33 permits the operator to exchange the tap T at an appropriate timing.

During the withdrawing process after the tapping procedure is discontinued, the spindle 14 is accelerated at the second acceleration rate α2 and is decelerated at the second deceleration rate −α2. Therefore, the cutting load torque Tq is decreased during the withdrawing process, which prevents the tap T and the workpiece W from being damaged.

Figure 10:
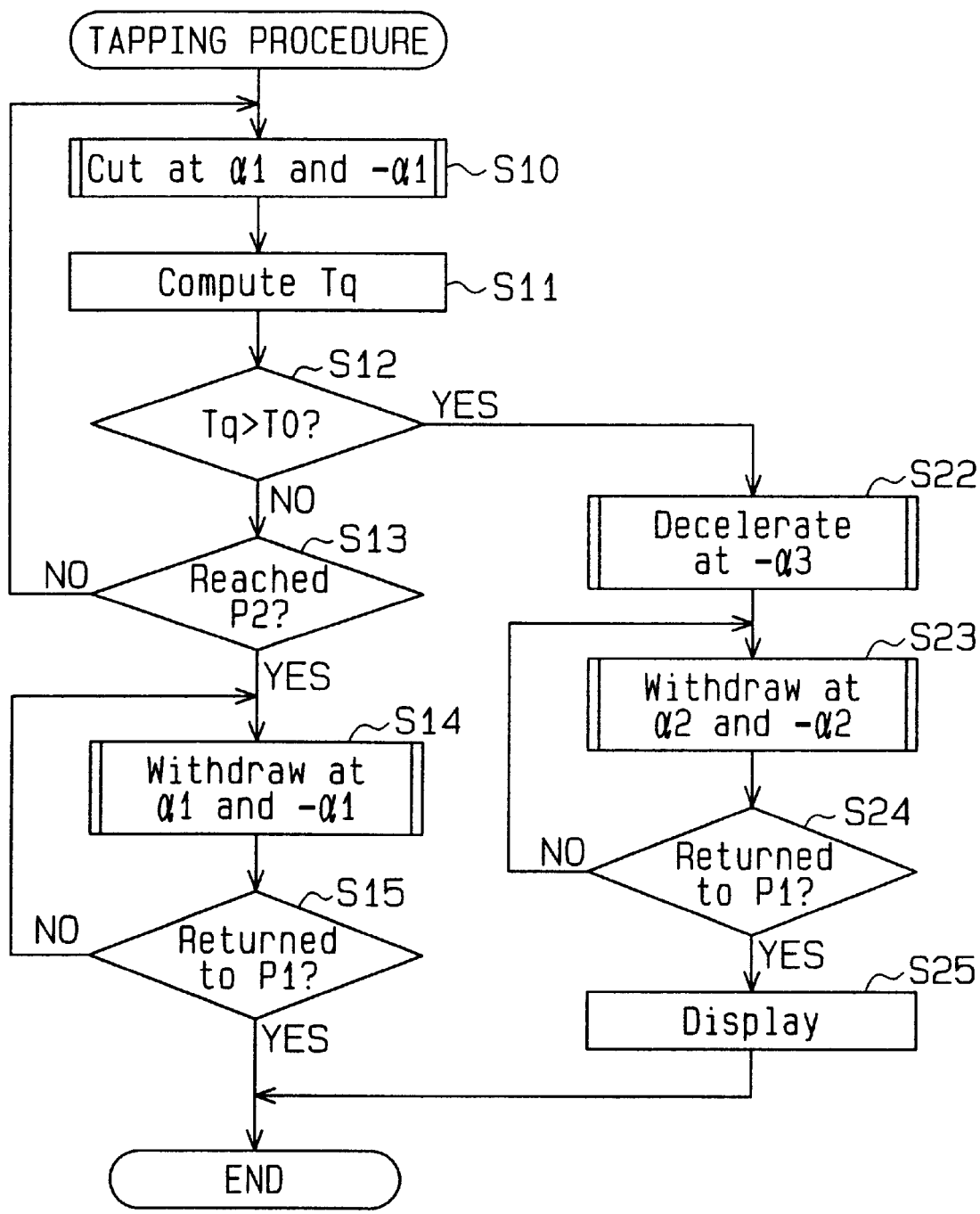
FIG. 10 is a flowchart showing a routine of a tapping procedure according to a second embodiment of the present invention.

A second embodiment of the present invention will now be described with reference to FIG. 10. FIG. 10 is a flowchart showing a tapping procedure according to the second embodiment. In the routine of FIG. 10, the same reference numerals are given to those steps that are the same as the corresponding steps an the flowchart of FIG. 1.

As shown in FIG. 10, steps S11-S21 of the routine of FIG. 1 are omitted. If the cutting load torque Tq exceeds the acceptable level T0 in step S12, the CPU 30 judges that the tap T is at the end of its life and executes step S22. In the embodiment of FIG. 10, whether swarf is stuck in the tap T is not detected.

It should be apparent to those skilled in the art that the present invention may be embodied in many other specific forms without departing from the spirit or scope of the invention. Particularly, it should be understood that the invention may be embodied in the following forms.

In the tapping procedures of FIGS. 1 and 10, a calculated value may be used as referential torque data instead of the value detected during no-workpiece operation. For example, the inertial load torque during a tapping procedure is computed based on the moment of inertia of the rotor of the spindle motor 15 or the moment of inertia of the spindle 14 and on data of changes of the speed of the spindle 14 during a tapping procedure. The computed inertial load torque is used as the referential load torque data.

In this manner, the referential load torque data may be obtained based at least on the inertial load torque acting on the spindle motor 15 during a tapping procedure. It is more preferable to compute all the load torques acting on the spindle motor 15 other than the cutting load torque and to use the computed torque for computing the referential torque. This applies not only to the case where the referential load torque data is calculated but also to a case where the referential torque is obtained based on the actual detected value.

In the tapping procedures shown in FIGS. 1 and 10, the value that is detected when the tap T is tapping the workpiece W may be used as the referential load torque data. In this case, the difference between the referential torque data and the load torque detected by the load detection device 25 after a subsequent tapping procedure is used as an increase amount of the cutting load torque. Then, the increase amount is compared with an acceptable level, which corresponds to the acceptable level T0.

In the illustrated embodiments, the referential torque corresponds to the period from when the tap T starts moving from the start position P1. However, the referential torque data may correspond only to a period from when the tap T starts cutting the workpiece W.

The acceleration rate of the spindle 14 in the acceleration step may have different absolute value from the deceleration rate of the spindle 14 in the deceleration stop. Also, the spindle 14 may be accelerated or decelerated by different acceleration rate and deceleration rate in the cutting process from the withdrawing process.

The acceleration rate (deceleration rate) of the spindle 14 need not be constant. The acceleration rate (deceleration rate) may be gradually changed.

The worktable 13 may be stationary and the spindle 14 may be moved along X, Y and Z axes. Alternatively, the spindle 14 may be stationary and the worktable 13 may be moved along X, Y and Z axes.

The present invention may be applied not only to a soft wired NC machine but also to a hard wired NC machine.

The present invention may be applied not only to a single-purpose tapping machine but also to a tapping machine such as an NC machining center complex NC machine), which performs synchronous tapping procedure.

Therefore, the present examples and embodiments are to be considered as illustrative and not restrictive and the invention is not to be limited to the details given herein, but may be modified within the scope and equivalence of the appended claims.

What is claimed is:

1. A tapping apparatus for cutting an internal thread in a workpiece with a tap, comprising:
    a spindle to which the tap is attached;
    a spindle motor for rotating the spindle;
    a detection device for detecting a load acting on the spindle motor during a tapping procedure, wherein the tapping procedure includes a cutting process, in which a workpiece is cut with the tap, and a withdrawing process, in which the tap is withdrawn from the workpiece; and
    a computer, wherein, in the cutting process, the computer performs an acceleration step to accelerate the spindle at a predetermined cutting rotational acceleration rate and a deceleration step to decelerate the spindle at a predetermined cutting rotational deceleration rate,
    wherein the computer compares the load detected by the detection device with a predetermined referential load to detect a relative cutting load acting on the tap, and
    wherein, when the relative cutting load exceeds a predetermined acceptable level, the computer stops the spindle by decelerating the spindle at a rotational deceleration rate that is different from the cutting deceleration rate thereby discontinuing the tapping process.

2. The tapping apparatus according to claim 1, wherein the referential load is set by taking at least an inertial load acting on the spindle motor during a tapping procedure into account.

3. The tapping apparatus according to claim 1, wherein the referential load is the load detected by the detection device when a tapping procedure is performed in the absence of a workpiece.

4. The tapping apparatus according to claim 3, wherein the computer computes the difference between the referential load and the load detected by the detection device during an actual tapping procedure and uses the difference as the relative cutting load acting on the tap.

5. The tapping apparatus according to claim 1, wherein the referential load is the load detested by the detection device when the tap taps a workpiece.

6. The tapping apparatus according to claim 5, wherein the computer computes the difference between the referential load and the load detected by the detection device after the referential load is set and uses the difference as the relative cutting load acting on the tap.

7. The tapping apparatus according to claim 1, wherein, when judging that the reason that the relative cutting load has exceeded the acceptable level is swarf stuck in the threaded hole that is being formed, the computer decelerates the spindle at a rotational deceleration rate that is smaller than the cutting rotational deceleration rate thereby stopping the spindle.

8. The tapping apparatus according to claim 1, wherein, when judging that the reason that the relative cutting load has exceeded the acceptable level is the expiration of the life of the tap, the computer decelerates the spindle at a rotational deceleration rate that is greater than the cutting rotational deceleration rate thereby stopping the spindle.

9. A tapping apparatus for cutting an internal thread in a workpiece with a tap, comprising:
   a spindle to which the tap is attached;
   a spindle motor for rotating the spindle;
   a detection device for detecting a load acting on the spindle motor during a tapping procedure, wherein the tapping procedure includes a cutting process, in which a workpiece is cut with a tap, and a withdrawing process, in which the tap is withdrawn from the workpiece; and
   a computer, wherein, in the withdrawing process, the computer performs an acceleration step to accelerate the spindle at a predetermined withdrawing rotational acceleration rate and a deceleration step to decelerate the spindle at a predetermined withdrawing rotational deceleration rate,
   wherein the computer compares the load detected by the detection device with a predetermined referential load to detect a relative cutting load acting on the tap, and
   wherein, when the relative cutting load exceeds a predetermined acceptable level, the computer stops the spindle to discontinue the tapping procedure and thereafter performs the withdrawing process by accelerating the spindle at a rotational acceleration rate that is smaller than the withdrawing rotational acceleration rate and decelerating the spindle at a rotational deceleration rate that is smaller than the withdrawing rotational deceleration rate.

10. A tapping apparatus for cutting an internal thread in a workpiece with a tap, comprising:
    a spindle to which the tap is attached;
    a spindle motor for rotating the spindle;
    a detection device for detecting a load acting on the spindle motor during a tapping procedure; and
    a computer, wherein the computer compares the load detected by the detection device with a predetermined referential load to detect a relative cutting load acting on the tap,
    wherein, when the relative cutting load exceeds a predetermined acceptable level, the computer stops the spindle to discontinue the tapping procedure, and wherein the computer starts the tapping procedure for the same threaded hole from the beginning, and
    wherein, if the number of the tapping procedures performed for the same threaded hole is more than a predetermined number when the relative cutting load exceeds the acceptable level, the computer judges that the life of the tap has expired and discontinues use of the tap.

11. The tapping apparatus according to claim 10, further comprising a display device, wherein the computer causes the display device to display that the life of the tap has expired.

12. The tapping apparatus according to claim 1, further comprising a display device, wherein, when the relative cutting load exceeds the acceptable level, the computer discontinues use of the tap and causes the display device to display that the life of the tap has expired.

13. The tapping apparatus according to claim 10, wherein the specific tapping procedure includes a tapping procedure that is performed in the absence of a workpiece.

14. The tapping apparatus according to claim 1, further comprising a feed motor for axially moving the spindle, wherein, during the tapping procedure, the computer controls the spindle motor and the feed motor such that a rotational phase of the spindle and an axial position of the spindle change synchronously.

15. The tapping apparatus according to claim 9, wherein the referential load is set by taking at least an inertial load acting on the spindle motor during a tapping procedure into account.

16. The tapping apparatus according to claim 9, wherein the referential load is the load detected by the detection device when a tapping procedure is performed in the absence of a workpiece.

17. The tapping apparatus according to claim 16, wherein the computer computes the difference between the referential load and the load detected by the detection device during an actual tapping procedure and uses the difference as the relative cutting load acting on the tap.

18. The tapping apparatus according to claim 9, wherein the referential load is the load detected by the detection device when the tap taps a workpiece.

19. The tapping apparatus according to claim 18, wherein the computer computes the difference between the referential load and the load detected by the detection device after the referential load is set and uses the difference as the relative cutting load acting on the tap.

20. The tapping apparatus according to claim 9, further comprising a display device, wherein, when the relative cutting load exceeds the acceptable level, the computer discontinues use of the tap and causes the display device to display that the life of the tap has expired.

21. The tapping apparatus according to claim 9, further comprising a feed motor for axially moving the spindle, wherein, during the tapping procedure, the computer controls the spindle motor and the feed motor such that a rotational phase of the spindle and an axial position of the spindle change synchronously.

22. The tapping apparatus according to claim 10, wherein the computer sets the load detected by the detection device during a specific tapping procedure as the referential load, and wherein the computer compares the load detected by the detection device during a normal tapping procedure with the referential load to detect the relative cutting load acting on the tap.

* * * * *

UNITED STATES PATENT AND TRADEMARK OFFICE
CERTIFICATE OF CORRECTION

PATENT NO. : 6,551,033 B2 Page 1 of 1
DATED : April 22, 2003
INVENTOR(S) : Yoshiaki Kakino et al.

It is certified that error appears in the above-identified patent and that said Letters Patent is hereby corrected as shown below:

<u>Title page,</u>
Item [73], insert:

-- Assignee: Yoshiaki Kakino, Kyoto, Japan
Mori Seiki Co., Ltd., Nara-ken, Japan
Yasda Precision Tools K.K., Okayama-ken, Japan
Osaka Kiko Co., Ltd., Osaka-shi, Japan
Mitsubishi Denki Kabushiki Kaisha, Tokyo, Japan
Yamazaki Mazak Kabushiki Kaisha, Aichi-ken, Japan --

<u>Column 6,</u>
Line 58, delete "316" and insert therefor -- S16 --.

<u>Column 9,</u>
Line 18, delete "S11" and insert therefor -- S16 --.

<u>Column 10,</u>
Line 59, delete "detested" and insert therefor -- detected --.

Signed and Sealed this

Twenty-first Day of October, 2003

JAMES E. ROGAN
*Director of the United States Patent and Trademark Office*